(12) United States Patent
DeAnda et al.

(10) Patent No.: US 8,822,597 B2
(45) Date of Patent: Sep. 2, 2014

(54) INCREASING RUBBER PHASE VOLUME IN RUBBER-MODIFIED POLYSTYRENE

(75) Inventors: Carlos DeAnda, Houston, TX (US); Graciela Morales, Saltillo (MX); Jose M. Sosa, Deer Park, TX (US); David Knoeppel, League City, TX (US)

(73) Assignee: Fina Technology, Inc., Houston, TX (US)

(*) Notice: Subject to any disclaimer, the term of this patent is extended or adjusted under 35 U.S.C. 154(b) by 267 days.

(21) Appl. No.: 13/095,940

(22) Filed: Apr. 28, 2011

(65) Prior Publication Data
US 2012/0277375 A1 Nov. 1, 2012

(51) Int. Cl.
*C08F 279/00* (2006.01)
*C08F 279/02* (2006.01)
*C08F 287/00* (2006.01)
*C08F 285/00* (2006.01)
*C08F 297/04* (2006.01)

(52) U.S. Cl.
CPC ............. *C08F 279/02* (2013.01); *C08F 285/00* (2013.01); *C08F 297/044* (2013.01)
USPC .................... 525/53; 525/64; 525/69; 525/70; 525/71; 525/86; 525/87; 525/88; 525/95; 525/98; 525/99

(58) Field of Classification Search
USPC ......... 525/53, 54, 64, 69, 260, 263, 265, 273, 525/70, 71, 86, 87, 88, 95, 98, 99
See application file for complete search history.

(56) References Cited

U.S. PATENT DOCUMENTS

| | | | | |
|---|---|---|---|---|
| 3,264,374 A | * | 8/1966 | Jones | 525/263 |
| 4,777,210 A | * | 10/1988 | Sosa et al. | 525/53 |
| 5,189,095 A | * | 2/1993 | Hall | 525/53 |
| 5,506,304 A | * | 4/1996 | Otsuzuki et al. | 525/53 |
| 5,550,194 A | * | 8/1996 | Hoxmeier et al. | 525/250 |
| 6,380,305 B1 | * | 4/2002 | Sheu | 525/71 |
| 7,754,817 B2 | | 7/2010 | Sosa et al. | |
| 2006/0235130 A1 | * | 10/2006 | Hanner et al. | 524/457 |
| 2006/0247375 A1 | * | 11/2006 | Myers et al. | 525/70 |
| 2007/0100079 A1 | * | 5/2007 | Sosa et al. | 525/244 |

\* cited by examiner

*Primary Examiner* — Roberto Rabago

(57) ABSTRACT

A process for producing rubber modified polymers having an increased rubber phase volume, including feeding a vinyl aromatic monomer and an elastomer to a polymerization reactor to form a reaction mixture, polymerizing the reaction mixture, combining a copolymer to the polymerized reaction mixture to form a combined mixture, subjecting the combined mixture to further polymerization, and obtaining a rubber modified polymer product from the further polymerization.

19 Claims, 20 Drawing Sheets

Figures 13a-d
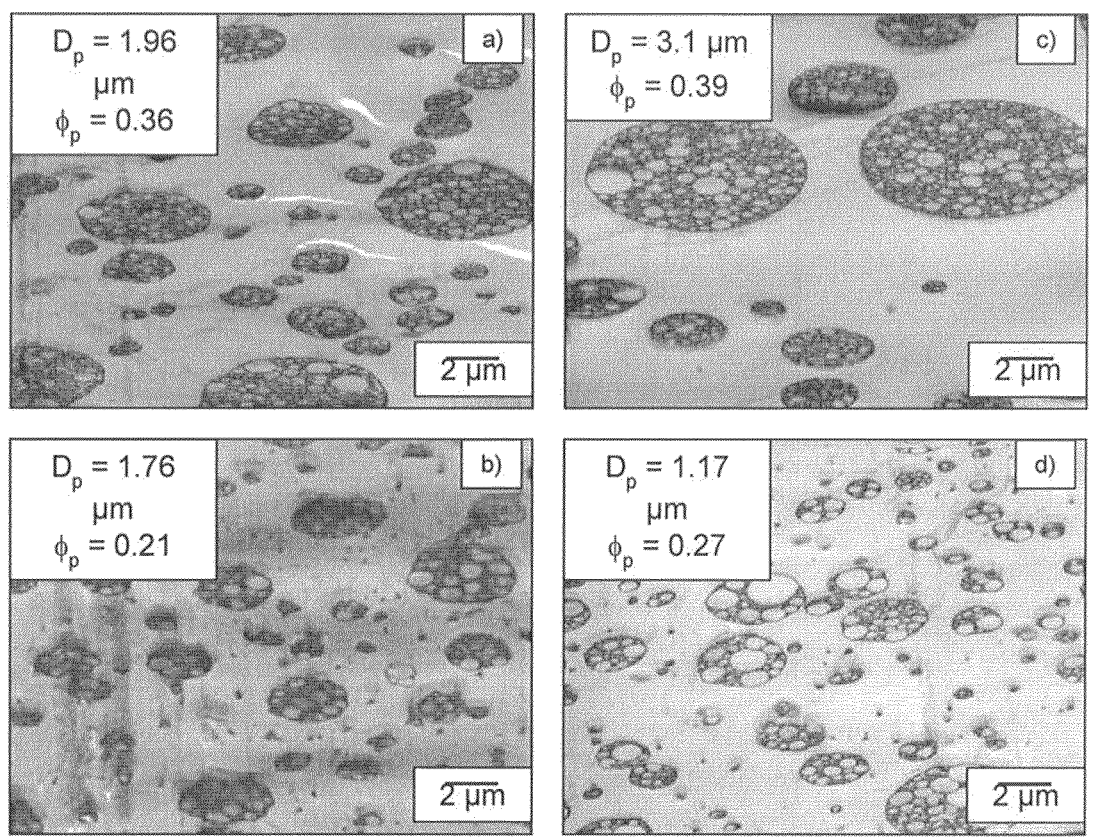

INCREASING RUBBER PHASE VOLUME IN RUBBER-MODIFIED POLYSTYRENE

FIELD

The present invention is generally related to methods of making rubber-modified polystyrene. More specifically, the present invention is generally related to methods of increasing the rubber phase volume of rubber-modified polystyrene.

BACKGROUND

Polystyrene is a widely used commercially available plastic. Pure polystyrene is a hard plastic having limited flexibility and is thus well suited to applications where its level of stiffness is acceptable. In other situations, the limited flexibility or rigidity of pure polystyrene may be unacceptable. In these situations, styrene-based copolymers, and particularly polystyrene resins that are modified with organic rubber particles or other elastomers, have been found useful. The rubber modified styrene compositions contain a matrix of a styrenic resin and a rubber component in particle form dispersed in the matrix. These rubber modified styrene compositions include compositions typically referred to as high impact polystyrene, or HIPS.

In the final HIPS product, the rubber particles are incorporated into the HIPS product, wherein rubber particles make up a rubber phase volume fraction (RPVF). The properties of HIPS may be affected by the RPVF. It has been observed that a larger RPVF may confer some desirable properties to HIPS. Many attempts have been made to increase the RPVF by increasing the size of polystyrene occlusions trapped within the rubber particles. While the size and distribution of the rubber particles are controlled by several factors including bulk viscosity of the two phase system, the shear rate applied to the system, the level of emulsifier, the surface tension of the solution and the viscosity ratio of the discontinuous phase, or rubber phase, to the viscosity of the matrix, controlling the size of the occlusions has been more elusive. It would therefore be desirable to produce a HIPS product having an increased RPVF. It would also be desirable to have a method that is able to control and/or increase the size of the polystyrene occlusions.

SUMMARY

Disclosed herein is a method for producing rubber-modified polymers having an increased rubber phase volume. The method includes feeding a vinyl aromatic monomer and an elastomer to a polymerization reactor(s) to form a reaction mixture that is polymerized. A copolymer is added to the polymerized reaction mixture to form a combined mixture that is subjected to further polymerization to obtain a rubber modified product.

In a non-limiting embodiment, either by itself or in combination with any other embodiment of the invention, the reactor(s) can be a pre-inversion reactor or can be a pre-inversion reactor followed by an inversion reactor. The reaction mixture can also include a free radical initiator. The copolymer can include at least one polystyrene graft on an elastomer backbone. The copolymer can include at least one polystyrene graft on a polybutadiene backbone. The copolymer can alternately include a block copolymer.

In a non-limiting embodiment, either by itself or in combination with any other embodiment of the invention, the copolymer can be produced using an organolithium initiator for the anionic polymerization of polystyrene and polybutadiene chains to predetermined molecular weights, and the polystyrene and polybutadiene chains can then be joined by a polyfunctional coupling agent, such as chlorosilanes or 1,1-diphenylethylene derivatives. The molecular weight of the polystyrene chain can be from 50 to 200 kg/mol per chain. The molecular weight of the polybutadiene backbone can be from 50 to 250 kg/mol per chain.

In a non-limiting embodiment, either by itself or in combination with any other embodiment of the invention, the copolymer can be added to the inversion reactor or can be added before the inversion reactor. The copolymer can be added in amounts ranging from 0.5 to 40 wt. % based on the total weight of the elastomer. The product can include rubber particles comprising polystyrene occlusions.

An alternate embodiment, either by itself or in combination with any other embodiment of the invention, is a method for increasing rubber phase volume in high impact polystyrene that includes feeding at least one vinyl aromatic monomer, an elastomer, and a free radical initiator to a first reactor to form a reaction mixture, polymerizing the reaction mixture in the first reactor to a point below the point at which phase inversion occurs, feeding the reaction mixture from the first reactor along with a copolymer, to a second reactor, and polymerizing the mixture in the second reactor to at least a phase inversion point of the mixture.

In a non-limiting embodiment, either by itself or in combination with any other embodiment, the copolymer can include at least one polystyrene graft on an elastomer backbone or on a polybutadiene backbone, and can include two or more polystyrene grafts on a polybutadiene backbone. The copolymer can alternately include a block copolymer. The copolymer can be produced using an organolithium initiator for the anionic polymerization of polystyrene and polybutadiene chains to predetermined molecular weights, and the polystyrene and polybutadiene chains can then be joined by a polyfunctional coupling agent, such as chlorosilanes or 1,1-diphenylethylene derivatives. The copolymer can be added in amounts ranging from 0.5 to 15 wt. % based on the total weight of the elastomer.

In a non-limiting embodiment, either by itself or in combination with any other embodiment, the reaction mixture leaving the second reactor can be further polymerized in at least one additional reactor and a product from the at least one additional reactor can include rubber particles comprising polystyrene occlusions.

An alternate embodiment of the present invention, either by itself or in combination with any other embodiment of the invention, is a method for producing high impact polystyrene having a multimodal rubber particle size distribution. The method includes feeding at least one vinyl aromatic monomer and at least one elastomer to at least one polymerization reactor to form a reaction mixture and polymerizing the reaction mixture. At least one copolymer is added to the polymerized reaction mixture leaving the reactor to form a combined mixture that is subjected to further polymerization to obtain a HIPS product having a multimodal rubber particle size distribution.

Other possible embodiments include two or more of the above aspects of the invention. In an embodiment the method includes all of the above aspects and the various procedures can be carried out in any order.

BRIEF DESCRIPTION OF DRAWINGS

FIGS. 13a-b show the morphology of the obtained HIPS when COP $S_1B_2$-2 and COP $S_2B_2$-8 are added at the beginning of the reaction, respectively.

FIGS. 13c-d show the morphology of the obtained HIPS when copolymers COP $S_1B_2$-2 and COP $S_2B_2$-8 are added 30 minutes after the beginning of the reaction, respectively.

DETAILED DESCRIPTION

The present invention includes methods of increasing the rubber phase volume in rubber-modified polymers. Rubber-reinforced polymers of monovinylaromatic compounds, such as styrene, alpha methyl styrene and ring-substituted styrenes are desirable for a variety of applications including but not limited to: refrigerator linings, food and drink containers as well as other packaging applications. The rubber-reinforced styrenic polymers disclosed herein may also be useful in a broad range of applications including, but not limited to: lighting, construction, medical ware, medical devices, toys, gloss lamination, and bottles.

A common example of a rubber-modified styrene composition includes high impact polystyrene (HIPS). Other rubber modified styrene compositions include styrene-butadiene-styrene (SBS), styrene-isoprene-styrene (SIS), acrylonitrile-butadiene-styrene copolymer (ABS), acrylonitrile-acrylic rubber-styrene (AAS), acrylonitrile-(ethylene-propylene rubber)-styrene copolymer, acrylonitrile-EPDM-styrene copolymer (AES), and methyl methacrylate-butadiene-styrene copolymer (MBS). In an embodiment, the rubber-modified styrenic composition is selected from the group of HIPS and ABS.

HIPS contains an elastomeric phase that is embedded in a styrenic polymer, resulting in a composition having an increased impact resistance and improved ductility. In an embodiment, the HIPS of the present invention may be manufactured in accordance with any conventional process. Conventional HIPS manufacturing processes include mass polymerization and solution polymerization such as that disclosed in U.S. Pat. No. 2,694,692 or mass suspension polymerization such as that disclosed in U.S. Pat. No. 2,862,906. Other processes of manufacture may also be used.

Figure 4A:
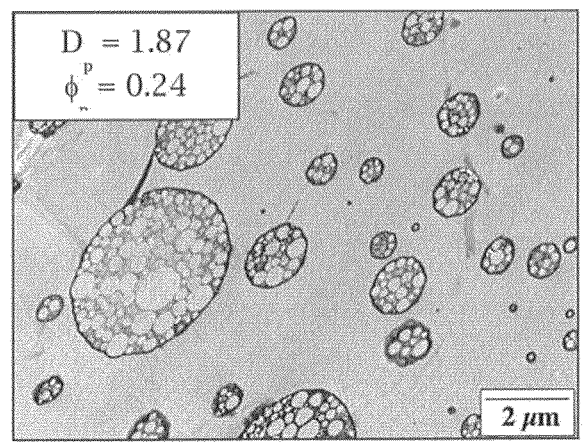
FIGS. 4a-b show TEM micrographs for the HIPS containing COP-$S_1B_2$-1 and COP-$S_1B_2$-2, respectively.
Figure 4B:
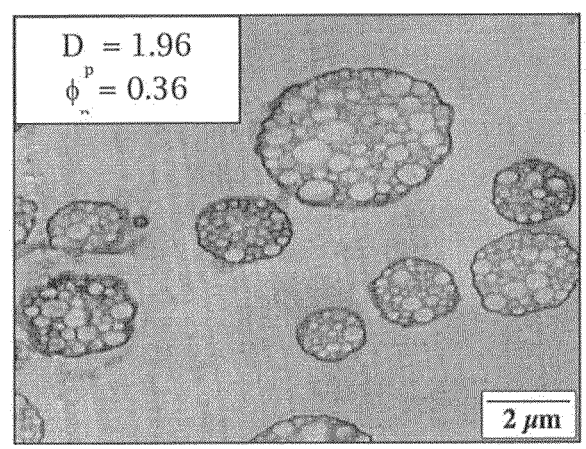

High impact polystyrene (HIPS) is characterized as a two-phase polymer system in which an elastomer, such as polybutadiene, is dispersed into a glassy matrix of polystyrene, due to the incompatibility of the elastomer and polystyrene. The phase separation occurs shortly after the beginning of the polymerization, creating a polymeric oil-in-oil emulsion, with polystyrene and styrene as the dispersed phase and the elastomer and styrene as the dispersion medium. During the course of polymerization, the emulsion inverts such that the elastomer and styrene are in the dispersed phase with polystyrene and styrene as the dispersion medium. The final HIPS product includes a continuous polystyrene phase and a discontinuous rubber phase. The discontinuous rubber phase may be generally spherical with occlusions of polystyrene particles, as shown in the microphotographs of FIGS. 4a-b. The mechanical properties of the HIPS are related to the morphology, including the size of the occlusions, of the HIPS.

An embodiment of a high-impact polystyrene (HIPS) that can be made by the current invention may have a melt flow rate ranging from 1 to 40 g/10 min., optionally from 1.5 to 20 g/10 min., and optionally from 2 to 15 g/10 min. as determined in accordance with ASTM D-1238. In an embodiment, the HIPS may have a falling dart impact ranging from 5 to 300 in-lb, optionally from 50 to 180 in-lb, and optionally from 100 to 150 in-lb as determined in accordance with ASTM D-3029. In an embodiment, the HIPS may have an Izod impact ranging from 0.4 to 5 ft-lbs/in, optionally from 1 to 4 ft-lbs/in, and optionally from 2 to 3.5 ft-lbs/in as determined in accordance with ASTM D-256. In an embodiment, the HIPS may have a tensile strength ranging from 2,000 to 10,000 psi, optionally from 2,800 to 8,000 psi, and optionally from 3,000 to 5,000 psi as determined in accordance with ASTM D-638. In an embodiment, the HIPS may have a tensile modulus ranging from 100,000 to 500,000 psi, optionally from 200,000 to 450,000 psi, and v from 250,000 to 380,000 psi as determined in accordance with ASTM D-638. In an embodiment, the HIPS may have an elongation ranging from 0.5 to 90%, optionally from 5 to 70%, and optionally from 35 to 60% as determined in accordance with ASTM D-638. In an embodiment, the HIPS may have a flexural strength ranging from 3,000 to 15,000 psi, optionally from 4,000 to 10,000 psi, and optionally from 6,000 to 9,000 psi as determined in accordance with ASTM D-790. In an embodiment, the HIPS may have a flexural modulus ranging from 200,000 to 500,000 psi, optionally from 230,000 to 400,000 psi, and optionally from 250,000 to 350,000 psi as determined in accordance with ASTM D-790. In an embodiment, the HIPS may have an annealed heat distortion ranging from 180 to 215° F., optionally from 185 to 210° F., and optionally from 190 to 205° F. as determined in accordance with ASTM D-648. In an embodiment, the HIPS may have a Vicat softening ranging from 195 to 225° F., optionally from 195 to 220° F., and optionally from 200 to 215° F. as determined in accordance with ASTM D-1525. In an embodiment, the HIPS may have a gloss 60° ranging from 30 to 100, optionally from 40 to 98, and optionally from 50 to 95 as determined in accordance with ASTM D-523.

The properties of high impact polystyrene (HIPS) can be significantly affected by the rubber phase volume fraction (RPVF). It has been found that the RPVF can be increased by increasing the size of polystyrene occlusions as well as narrowing the size distributions of the polystyrene occlusions trapped within rubber particles from the rubber fraction of the HIPS. Therefore, as the PS occlusions increase, the RPVF increases. The RPVF may be measured by determining the percent gel of the resin. The determination of % gel is described in U.S. Pat. No. 4,777,210. As the PS occlusion size increases, the RPVF increases as well as the % gel/rubber, at a constant swell index. The RPVF may also be measured by mechanical testing. The mechanical testing can include dynamic mechanical analysis (DMA) using the Kerner composite equation as specified in *Stephane Jouenne et al., Styrene-Butadiene Gradient Block Copolymers for Transparent Impact Polystyrene*, Macromolecules 2008, volume 41, pages 9823-9830, page 9829.

In an embodiment of the present invention, either by itself or in combination with any other aspect of the invention, the size of the occlusions can be increased by the inclusion of a graft copolymer in the HIPS. During the formulation of the oil-in-oil emulsion some grafting of polystyrene onto the elastomer may occur, resulting in a graft copolymer. The resulting graft copolymer can act as an emulsifier, thus stabilizing the emulsion of the two-phase system.

The final HIPS product of the present invention may contain a styrenic polymer, an elastomeric component, and a copolymer. In an embodiment, the final HIPS product is obtained by combining and reacting a styrenic monomer, an elastomeric component, a graft copolymer and free radical initiator.

In an embodiment, either by itself or in combination with any other aspect of the invention, one or more styrene compounds are used as monomers for the formation of the styrenic polymer. Styrene, also known as vinyl benzene, ethylenylbenzene, and phenylethene is an organic compound represented by the chemical formula $C_8H_8$. As used herein the term styrene includes a variety of substituted styrenes (e.g., alpha-methyl styrene), ring substituted styrene such as p-methylstyrene, disubstituted styrenes such as p-t-butyl styrene as well as unsubstituted styrenes. In an embodiment, the styrenic monomer may be selected from the group of styrene, alkylstyrenes [e.g., monoalkylstyrenes such as vinyltoluenes (e.g., o-, m-, p-methylstyrenes), vinylxylenes (e.g., 2,4-dimethylstyrene), and alkyl-substituted styrenes (e.g., $C_{1-4}$alkylstyrenes) such as ethylstyrene, p-isopropylstyrene, butylstyrene, and p-t-butylstyrene; diakylstyrenes (di$C_{1-4}$alkylstyrenes such as 2,4-dimethylstyrene), α-alkyl-substituted styrenes (e.g., α-$C_{1-2}$alkylstyrenes such as α-methylstyrene and α-methyl-p-styrene)], alkoxystyrenes (e.g., $C_{1-4}$alkoxystyrenes such as o-methoxystyrene, m-methoxystyrene, p-methoxystyrene, p-t-butoxystyrene), halostyrenes (e.g., o-, m-, and p-chlorostyrenes, p-bromostyrene), styrene sulfonic acid, and alkaline metal salts thereof as well as any combinations thereof.

In an embodiment, the styrenic monomers are present in a reaction mixture used to prepare HIPS in amounts from 1.0 to 99.9 weight percent (wt. %) by total weight of the mixture. In another embodiment, the styrenic monomers are present in amounts from 50 to 99 wt. %. In a further embodiment, the styrenic monomers are present in amounts from 80 to 99 wt. %. In an embodiment, the reaction mixture used to prepare HIPS contains rubber, or other elastomeric component, in amounts up to 15 wt. % and optionally mineral oil in amounts ranging up to 5 wt. % or more.

The elastomeric phase may include any type or variety of known elastomer or rubbery polymers or any combinations thereof. In an embodiment, a HIPS product contains a conjugated diene monomer as the elastomer.

Examples of suitable conjugated diene monomers include without limitation 1,3-butadiene, 2-methyl-1,3-butadiene, 1 chloro-1,3 butadiene, styrene-butadiene rubber (SBR) and 2 chloro-1,3-butadiene. In another embodiment, the HIPS product contains an aliphatic conjugated diene monomer as the elastomer. Examples of suitable aliphatic diene monomers include, without limitation, $C_4$ to $C_9$ dienes such as butadiene monomers. The elastomeric component may also include blends or copolymers of the diene monomers. In an embodiment, the selected elastomeric component includes butadiene monomer.

The elastomer may be present in amounts effective to produce one or more user-desired properties. Such effective amounts may be determined by one having ordinary skill in the art with the aid of this disclosure. In an embodiment, the level of elastomer utilized is in an amount ranging from 0.1 to 50 wt. % by weight of solution. In another embodiment, the level of elastomer utilized is in an amount ranging from 0.5 to 40 wt. %. In a further embodiment, the level of elastomer utilized is in an amount ranging from 1 to 30 wt. %. In an even further embodiment, the level of elastomer utilized is in the range of about 5 to 15 wt. %.

In an embodiment, either by itself or in combination with any other aspect of the invention, the reaction mixture contains one or more styrene monomers used in the preparation of a copolymer. One or more styrene compounds may be used in the preparation of a graft copolymer, or linear block copolymers, or combinations thereof. These one or more styrene compounds may include, but are not limited to, one selected from the group of styrene, alkylstyrenes [e.g., monoalkylstyrenes such as vinyltoluenes (e.g., o-, m-, p-methylstyrenes), vinylxylenes (e.g., 2,4-dimethylstyrene), and alkyl-substituted styrenes (e.g., $C_{1-4}$alkylstyrenes) such as ethylstyrene, p-isopropylstyrene, butylstyrene, and p-t-butylstyrene; diakylstyrenes (di$C_{1-4}$alkylstyrenes such as 2,4-dimethylstyrene), α-alkyl-substituted styrenes (e.g., α-$C_{1-2}$alkylstyrenes such as α-methylstyrene and α-methyl-p-styrene)], alkoxystyrenes (e.g., $C_{1-4}$alkoxystyrenes such as o-methoxystyrene, m-methoxystyrene, p-methoxystyrene, p-t-butoxystyrene), halostyrenes (e.g., o-, m-, and p-chlorostyrenes, p-bromostyrene), styrene sulfonic acid, and alkaline metal salts thereof as well as any combinations thereof.

In an embodiment, either by itself or in combination with any other aspect of the invention, the copolymer is a graft copolymer. In an embodiment, the graft copolymer is a branched copolymer in which the side chains are structurally distinct from the main chain. The individual chains, both side chains and main chains, may be homopolymers or copolymers. In an embodiment, the graft copolymer includes an elastomer backbone having at least one polystyrene (PS) graft onto the elastomer backbone. In another embodiment, the graft copolymer includes an elastomer backbone having one polystyrene graft onto the elastomer backbone. In a further embodiment, the graft copolymer includes an elastomer backbone having two polystyrene grafts onto the elastomer backbone. In an embodiment, the elastomer backbone of the graft copolymer is a polybutadiene backbone (PBd), which results in polystyrene-polybutadiene graft copolymer (PBd-g-PS).

Graft copolymers can comprise a polybutadiene chain with at least one polystyrene segment grafted thereto. In one embodiment, graft copolymers with a single graft comprise two polybutadiene chains and a single polystyrene chain joined by a coupling agent. This type is herein referred to as "$S_1B_2$ graft copolymers." In another embodiment, graft copolymers with two grafts comprise two polybutadiene chains and two polystyrene chains joined by a central point by a coupling agent, resulting in a radial formation. This type of copolymer is herein referred to as "$S_2B_2$ graft copolymers." In other embodiments, graft copolymers have two or more grafts, and the polystyrene chains may or may not be grafted to the polybutadiene backbone at the same location(s). Note that for both $S_1B_2$ graft copolymers and $S_2B_2$ graft copolymers, the copolymers are made using two polybutadiene chains, which are generally of equal molecular weight. However, the polybutadiene can be visualized as a single polybutadiene chain with one or two polystyrene chains grafted thereto.

In an embodiment, either by itself or in combination with any other embodiment of the invention, the copolymer is a block copolymer. In an embodiment, the block copolymer is selected from the group of styrene-butadiene (SB) and styrene-butadiene-styrene (SBS) triblock copolymer, and combinations thereof. Block copolymers selected from the group of styrene-butadiene (SB) copolymers are herein referred to as "$S_1B_1$ block copolymers."

The segments of the copolymers can be made via anionic polymerization and joined with a coupling agent. Anionic polymerization can be carried via any known method, for example, high vacuum anionic polymerization. The initiator for anionic polymerization can be an organolithium, such as sec-butyllithium. Polystyrene and polybutadiene chains can be formed that are of predetermined molecular weight. For $S_1B_2$ graft copolymers, polystyrene chains can be combined with an excess of a coupling agent, and then combined with the polybutadiene chains, in a greater than 2/1 ratio of polybutadiene chains to polystyrene chains. The coupling agent can be trichloromethylsilane. For $S_2B_2$ graft copolymers, polystyrene chains can be coupled with PEB (1,3-bis(1-phenylethenyl)benzene) and then combined with polybutadiene monomer. Other coupling agents can also be used in the production of styrene butadiene copolymers, especially polyfunctional compounds with functional groups that can react with carbon to lithium bonds to add the carbon chain to the functional group. These other coupling agents may be selected from 1,4-dibromo-2-butene, α,α'-dibromo-p-xylene and divinyl benzene.

The initiator may be present in any desired amounts. The amount of initiator used may be determined by the desired molecular weight of the polybutadiene or polystyrene chains, according to the expression Mn=(g of polymer)/(mol of initiator).

The molecular weight of the polystyrene and polybutadiene chains can be varied, which can allow control over the formation of the rubber phase. For $S_1B_2$ graft copolymers, the polystyrene chain can have a molecular weight of from 30 to 400 kg/mol, optionally from 50 to 130 kg/mol, optionally from 70 to 115 kg/mol and the two polybutadiene chains can total from 30 to 300 kg/mol, optionally from 50 to 150 kg/mol, optionally from 60 to 130 kg/mol. The total molecular weight of the $S_1B_2$ graft copolymer can thus be from 60 to 700 kg/mol, optionally from 100 to 275 kg/mol, optionally from 130 to 230 kg/mol. For $S_2B_2$ graft copolymers, each polystyrene chain can have a molecular weight of from 30 to 400 kg/mol, optionally from 50 to 200 kg/mol, optionally from 75 to 150 kg/mol, and the two polystyrene chains can total from 50 to 500 kg/mol, optionally from 100 to 400 kg/mol, optionally from 150 to 300 kg/mol. The two polybutadiene chains can total from about 50 to 250, optionally from about 70 to 120 kg/mol. The total molecular weight of the $S_2B_2$ graft copolymer can thus be from 80 to 800 kg/mol, optionally from 150 to 650 kg/mol, optionally from 220 to 420 kg/mol. For $S_1B_1$ block copolymers, the polystyrene chain can be from 5.2 g/mol to 57 kg/mol, and the polybutadiene chain can be from 4.8 g/mol to 75 kg/mol. The molecular weight of the various styrene butadiene copolymers can be characterized via many known methods, including gel permeation chromatography per ASTM 5296-05.

By selecting molecular weights and architecture of styrene butadiene copolymers, it is possible to select for certain rubber phase volumes in rubber-modified styrenic polymers of the present. In general, for graft copolymers, higher molecular weights of the elastomer backbone polybutadiene chains may increase the rubber particle size (RPS), while higher molecular weights of the polystyrene chain(s) and higher numbers of grafts may decrease RPS.

The graft ratio, or g-value, is the ratio of the amount of the styrenic monomer relative to that of the rubber component, or elastomeric component, of the rubber-modified styrenic polymer. The graft ratio may be measured by dissolving an amount of a rubber-modified styrenic polymer in an amount of a mixed solvent, such as [methyl ethyl ketone/acetone (1/1 v/v)]. The mixture is then subjected to a centrifuge to produce an insoluble portion, wherein the weight fraction (on solid basis) of the insoluble portion is defined as a "gel portion". The weight fraction of the rubber contained in the amount of the styrenic resin measured accordingly is defined as a "rubber content". The graft ratio is represented by the following equation:

$$\text{Graft ratio}=[\text{gel portion}(g)-\text{rubber content }(g)]/\text{rubber content}(g)$$

The g-value is an index representing the degree of grafting of the styrenic monomer relative to the rubber component. In an embodiment, the g-value is at least 1. In another embodiment, the g-value ranges from 1 to 5. In a further embodiment, the g-value ranges from 2 to 3. A g-value of less than 1 indicates that the proportion of the grafted styrenic monomer is small relative to the rubber content, which can lead to a reduction in rubber efficiency and impact resistance. Meanwhile, a g-value greater than 5 may cause deterioration in rigidity and unbalanced physical properties rendering the polymeric product insufficient for practical use.

Both the surface gloss and impact strength of the styrenic resin are also influenced by the particle size of the rubber component dispersed in the styrenic resin matrix. The particle size of the dispersed rubber is an average value calculated by taking a transmission electron photomicrograph of an ultrathin slice cut from a styrenic resin and measuring the particle size therein. The mean particle size is represented by the following formula:

$$\text{Mean particle size}=(\Sigma n_i D_i^4)/(\Sigma n_i D_i^3)$$

In the equation, $n_i$ represents the number of rubbery polymer particles regarded as spheres having a particle size $D_i$ (μm).

In an embodiment, either by itself or in combination with any other aspect of the invention, the mean particle size of the dispersed rubber ranges from 0.1 to 5 μm. In another embodiment, the mean particle size of the dispersed rubber ranges from 0.5 to 4 μm. In a further embodiment, the mean particle size of the dispersed rubber ranges from 1 to 3 μm.

The morphology of the dispersed rubber particles in the rubber-modified styrenic polymer, or microdomain structure, may include a dominant morphology of a salami structure (e.g., a structure in which a plurality of styrenic resin phases are confined within one rubber particle, and the styrenic resin phases are partitioned from each other by the rubber phase), with a minor component of a core/shell structure (e.g., a structure in which a single styrenic resin phase is contained or confined within one rubber particle). The microdomain structure of a rubber-modified styrenic polymer including either a core/shell structure or a salami structure may be referred to as a unimodal type (having a unimodal structure). The microdomain structure of a rubber-modified styrenic polymer including both a core/shell structure and a salami structure may be referred to as a bimodal type (having a bimodal structure).

For the core/shell structure, the mean particle size of the dispersed rubber component may range from 0.1 to 1 μm, optionally from 0.2 to 0.8 μm, and alternatively from 0.3 to 0.7 μm.

For the salami structure, the mean particle size of the dispersed rubber component may range from 0.1 to 12 μm, optionally from 0.1 to 10 μm, optionally from 0.1 to 5 μm, optionally from 0.5 to 4 μm, and optionally from 1 to 3 μm.

In the rubber-modified styrenic polymer having the bimodal structure, suitable control of the conditions mentioned above allows the rubber component in small particles and large particles to be present in mixture in desired proportions. The proportions thereof are not particularly restricted, and the ratio of the small rubber particles to the large rubber particles may be selected from any desired amount. In an embodiment, the ratio of small rubber particles to large rubber particles ranges from the volumetric ratios of 40/60 to 95/5 (volume ratio) and optionally from volumetric ratios of 60/40 to 90/10 (volume ratio).

The dispersed rubber particles of both the core/shell structure and the salami structure having PS occlusion(s) contain a rubber membrane surrounding the PS occlusion(s) having a certain thickness. In an embodiment, either by itself or in combination with any other embodiment of the invention, the rubber membrane thickness ranges from 0.001 to 0.1 μm. In another embodiment, the rubber membrane thickness ranges from 0.005 to 0.05 μm. In a further embodiment, the rubber membrane thickness ranges from 0.01 to 0.03 μm.

The polystyrene (PS) occlusions within the core/shell structure and the salami structure may be of any size (diameter) that would achieve a desired rubber particle size. In an embodiment, either by itself or in combination with any other aspect of the invention, the PS occlusions have a size ranging from 0.05 to 2 μm. In another embodiment, the PS occlusions have a size ranging from 0.7 to 1 μm. In a further embodiment, the PS occlusions have a size ranging from 0.1 to 0.3 μm.

In a non-limiting embodiment, either by itself or in combination with any other embodiment of the invention, the graft copolymer may be added to or incorporated into the rubber component of the HIPS product in any amount sufficient to achieve the desired results. In an embodiment, the graft copolymer is added in amounts of greater than 0.5 wt. % based on the total weight of the rubber or other elastomeric component in the HIPS product. In another embodiment, the graft copolymer can be added in amounts ranging from 0.5 to 40 wt. % based on the total weight of the elastomer. In another embodiment, the graft copolymer is added in amounts ranging from 1 to 20 wt. %. In a further embodiment, the graft copolymer is added in amounts ranging from 3 to 15 wt. %. In another embodiment, the graft copolymer can be added in amounts ranging from 7 to 15 wt. % based on the total weight of the elastomer. In an embodiment, the graft copolymer is added just prior to inversion in amounts sufficient to result in an increase in RPVF.

A block copolymer(s) may be added to or incorporated into the rubber component of the HIPS product in any amount sufficient to achieve the desired results. In an embodiment, either by itself or in combination with any other embodiment of the invention, the block copolymer is added in amounts of greater than 0.5 wt. % based on the total weight of the rubber or other elastomeric component in the HIPS product. In another embodiment, the block copolymer can be added in amounts ranging from 0.5 to 40 wt. % based on the total weight of the elastomer. In another embodiment, the block copolymer is added in amounts ranging from 1 to 20 wt. %. In a further embodiment, the block copolymer is added in amounts ranging from 3 to 15 wt. %. In another embodiment, the block copolymer can be added in amounts ranging from 7 to 15 wt. % based on the total weight of the elastomer. In an embodiment, the block copolymer is added just prior to inversion in amounts sufficient to result in an increase in RPVF.

In an embodiment, either by itself or in combination with any other embodiment of the invention, the copolymer is added to the pre-inversion reactor product before the pre-inversion reactor product is sent to the inversion reactor. In an embodiment, the copolymer may be injected into a plug flow inversion reactor at any point prior to inversion. In another embodiment, the copolymer may be injected at any point prior to inversion. In a further embodiment, the copolymer may be injected at any point prior to inversion in the absence of a pre-inversion reactor.

In a non-limiting embodiment, either by itself or in combination with any other embodiment of the invention, the graft copolymer of the present invention may be produced by a separate polymerization process. In an embodiment, either by itself or in combination with any other embodiment of the invention, the graft copolymer of the present invention is obtained by anionic polymerization, wherein the anionic polymerization is performed under a vacuum similar to the graft copolymer production process described in *D. Uhrig, J. W. Mays, J. Polym. Sci. Part A: Poly Chem,* 43 (2005), 6179. The obtained graft copolymer is then added to the HIPS production process as described herein.

A general purpose polystyrene (GPPS), or crystal polystyrene, may be added to the HIPS polymerization process. In an embodiment, the GPPS is added to the styrene monomer feed. In another embodiment, the GPPS is introduced to the inversion reactor. In a further embodiment, the GPPS is added to the HIPS after the polymerization process.

The HIPS polymerization process can be either batch or continuous. In an embodiment, the polymerization reaction may be carried out using a continuous production process in a polymerization apparatus including a single reactor or a plurality of reactors. Reactors and conditions for the production of a polymeric composition are disclosed in U.S. Pat. No. 4,777,210, which is incorporated by reference herein in its entirety.

In an embodiment, either by itself or in combination with any other embodiment of the invention, the HIPS production process of the present invention includes a pre-inversion reactor followed by an inversion reactor followed by at least one post inversion reactor. In an embodiment, the pre-inversion reactor is a continuous stirred tank reactor (CSTR). In an alternative embodiment, the pre-inversion reactor is a plug flow reactor. In another embodiment, the inversion reactor is a CSTR. In an additional embodiment the inversion reactor is a plug flow reactor. In a further embodiment, the at least one post inversion reactor is a plug flow reactor. In an even further embodiment, the at least one post inversion reactor is a CSTR. In another alternative embodiment, the output of the at least one post inversion is sent to a devolatilizer. In yet another alternative embodiment, the output of the at least one post inversion reactor is sent to a heater prior to the devolatilizer step.

Figure 1:
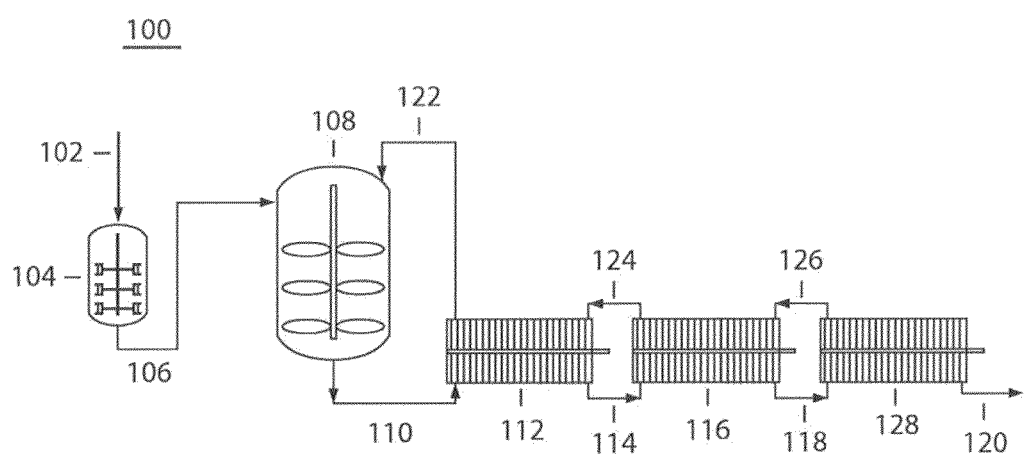
FIG. 1 is a schematic of a production process of the present invention.
Figure 2A:
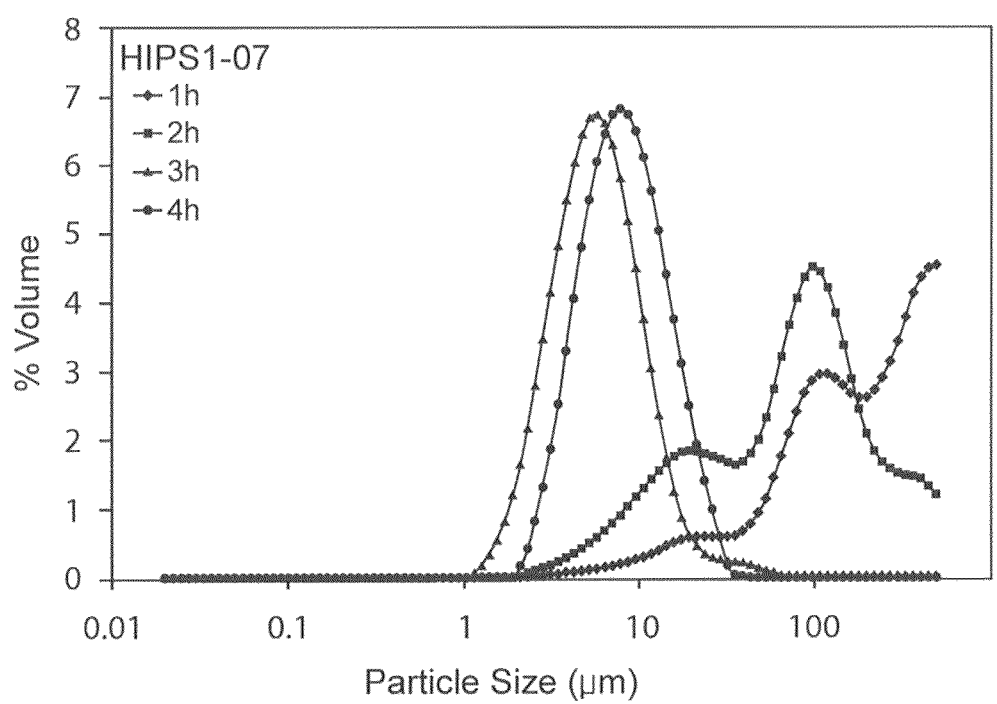
FIGS. 2a-d show the distribution of rubber particle size (μm) at different time intervals, for the HIPS containing 7, 15, 30, or 40% of COP-$S_1B_2$-1 by weight of graft copolymer in the rubber phase, respectively.
Figure 2B:
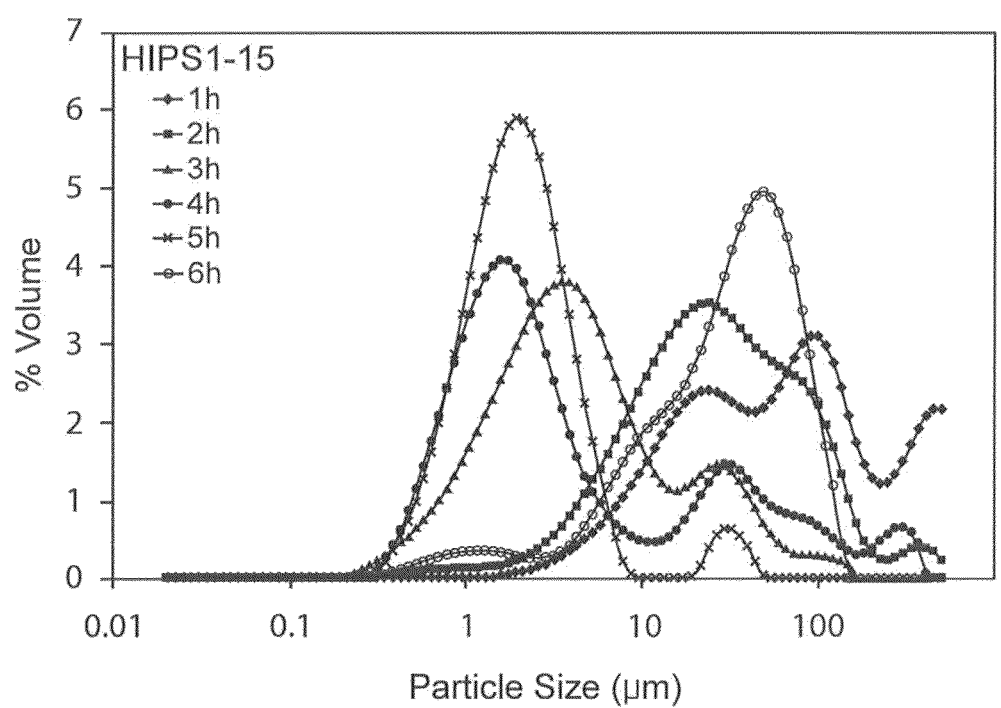
Figure 2C:
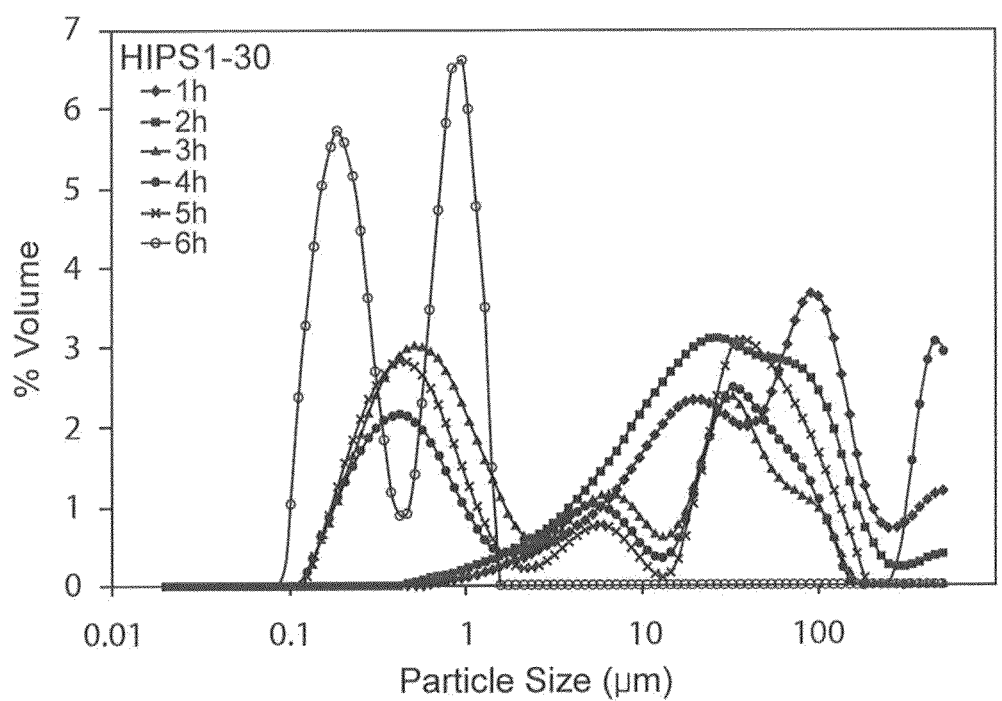
Figure 2D:
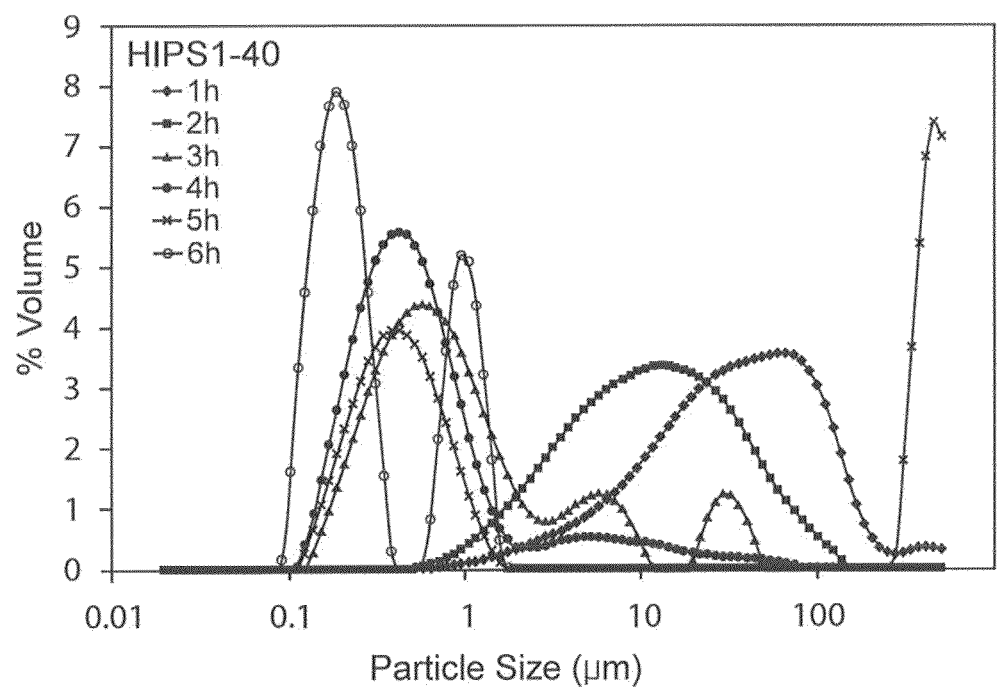

FIG. 1 illustrates a HIPS production process. In FIG. 1, a process 100 is depicted wherein a feedstream 102 is sent to a CSTR pre-inversion reactor 104 and the pre-inversion product stream 106 is sent to a CSTR inversion reactor 108 followed by three plug flow post inversion reactors 112, 116 and 128. The product stream of the CSTR inversion reactor 108 is sent to the first plug flow post inversion reactor 112 via line 110. The product stream of the first plug flow post inversion reactor 112 is sent to the second plug flow post inversion reactor 116 via line 114. The product stream of the second plug flow post inversion reactor 116 is sent to the final plug flow post inversion reactor 128 via line 118, wherein a product stream 120 is obtained from the final post inversion reactor 128. The product stream 120 is optionally sent to a conventional heater (not shown) followed by a conventional devolatilizer (not shown). In addition, there may be an optional recycle stream 122 from the first plug flow reactor 112 to the CSTR inversion reactor 108. Also, an optional recycle stream 124 may be present between plug flow reactors 112 and 116. An optional recycle stream 126 may also be present between plug flow reactors 116 and 128.

In an embodiment, the HIPS production process includes feeding an elastomer component, a styrene monomer and a free radical initiator to a pre-inversion reactor, in which the pre-inversion reactor is a CSTR. The output of the pre-inversion reactor is then sent to an inversion reactor in which the inversion reactor is a CSTR. The output of the inversion reactor is then sent to at least one linear flow reactor. In an embodiment, the inversion CSTR is bypassed or is not present and the inversion reaction occurs in a linear flow reactor.

In an embodiment, the pre-inversion reactor polymerizes the styrene and rubber mixture to a point below the phase inversion of the mixture. In an embodiment, the inversion reactor polymerizes the styrene and rubber mixture to a point above phase inversion. In an embodiment, the post inversion reactor further polymerizes the styrene and rubber mixture after polymerization in the inversion reactor. After polymerization to a point below phase inversion, the styrene and rubber are in a continuous phase in a solution while polystyrene is in a discontinuous phase. The moment, or point, of phase inversion is a discrete point at which the obtained polystyrene forms a continuous phase in a solution and styrene and rubber transition from a continuous phase to a discontinuous phase. The point of phase inversion is an important moment, because morphology obtained in that instant will remain present during the remainder of the polymerization. In an embodiment, the graft copolymer is added prior to or during the inversion reactor and may be located in the interphase between the continuous phase and the discontinuous phase stabilizing the emulsion.

The temperature ranges useful with the process of the present disclosure can be selected to be consistent with the operational characteristics of the equipment used to perform the polymerization. In one embodiment, the temperature range for the polymerization can be from 70° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. In an embodiment, a polymerization process for the production of HIPS of the type disclosed herein including a plurality of reactors may have the first reactor (e.g. a CSTR), also known as the pre-inversion reactor, operated in the temperature range of from 70° C. to 135° C. while the second reactor (e.g. CSTR or plug flow) may be operated in the range of from 100° C. to 165° C.

In an embodiment, either by itself or in combination with any other aspect of the invention, the HIPS product is devolatilized by a process including passing the HIPS through a devolatilizer (DV). In a more specific embodiment, the HIPS product is heated in a devolatilizer pre-heater (DVPH) and the heated HIPS product is sent to at least one devolatilizer where volatile components are separated from the HIPS product and are recycled to a previous reactor. In an embodiment, the devolatilizer pre-heater is a conventional devolatilizer pre-heater, such as a shell-and-tube heat exchanger. In another embodiment, the devolatilizer pre-heater is a plate heat exchanger. In a further embodiment, the at least one devolatilizer includes a first devolatilizer followed by a second devolatilizer. An embodiment of a plate heat exchanger devolatilizer pre-heater suitable for use in the present invention is disclosed in U.S. Pat. No. 7,332,058, which incorporated by reference herein in its entirety.

In an embodiment, either by itself or in combination with any other aspect of the invention, the process for the production of the styrenic polymer includes contacting the styrenic monomer and elastomer, and optionally one or more graft copolymers with at least one initiator. Any initiator capable of free radical formation that facilitates the polymerization of styrene may be employed. Such initiators include by way of example and without limitation azo compounds and organic peroxides. Examples of azo compounds useful for polymerization initiation include without limitation azobisisobutyronitrile (AIBN) and 1,1'-azobis(cyclohexanecarbonitrile) (ABCN). Examples of organic peroxides useful for polymerization initiation include without limitation diacyl peroxides, peroxydicarbonates, monoperoxycarbonates, peroxyketals, peroxyesters, dialkyl peroxides, hydroperoxides or combinations thereof. In an embodiment, the initiator level in the reaction mixture is given in terms of the active oxygen of neat initiator in parts per million (ppm) calculated as ppm active oxygen=fraction of active oxygen x ppm of initiator. As a non-limiting example L-233 for a 75% solution is 8.3%. Therefore 80 ppm of L-233 is equivalent to 0.083/.75×80 = 8.85 ppm active oxygen.

For example, the level of active oxygen level in the disclosed reactions for the production of the styrenic polymer is from 0.1 ppm to 80 ppm, alternatively from 1.0 ppm to 50 ppm, alternatively from 2.0 ppm to 30 ppm. As will be understood by one of ordinary skill in the art, the selection of initiator and effective amount will depend on numerous factors (e.g., temperature, reaction time) and can be chosen by one of ordinary skill in the art with the benefits of this disclosure to meet the desired needs of the process.

Polymerization initiators and their effective amounts have been described in U.S. Pat. Nos. 6,822,046; 4,861,127; 5,559,162; 4,433,099 and 7,179,873 each of which are incorporated by reference herein in their entirety. In another embodiment, a process for the production of the styrenic polymer includes contacting the styrenic monomer, an elastomer, and a graft copolymer with AIBN.

An alternate embodiment of the present invention is a method for producing high impact polystyrene having a multimodal rubber particle size distribution. The method includes feeding at least one vinyl aromatic monomer and at least one elastomer to at least one polymerization reactor to form a reaction mixture and polymerizing the reaction mixture. At least one copolymer is added to the polymerized reaction mixture leaving the reactor to form a combined mixture that is subjected to further polymerization to obtain a HIPS product having a multimodal rubber particle size distribution. A HIPS product having bimodal or trimodal characteristics can be obtained based on the type of copolymers used, or a unimodal polymer having a RPS distribution within a desired span can be obtained.

In an embodiment, either by itself or in combination with any other aspect of the invention, additives designed to increase the swell index of the HIPS product are added to the process of the present invention. These additives may include chain transfer agents (CTA). CTAs may also be added to control the molecular weight of the polystyrene. CTAs may also be added at the beginning of the polymerization reaction in order to control RPS. In an embodiment, the CTAs are selected from the group of mercaptans, thiols, and halocarbons and combinations thereof. In another embodiment, the CTAs are selected from the group of 1,1-diphenylethylene, 9,10-dihydrophenanthrene, 9,10-dihydroanthracene, 1-phenyl-3,4-dihydronaphthalene, α-methylstyrene dimer, 2-Naphthalenethiol, normal dodecylmercaptan (NDM), diethylbromomalonate, α-bromostyrene, β-bromostyrene and combinations thereof. These CTAs vary in strength from weak to strong. Stronger CTAs generally demonstrate a higher chain transfer constant while weaker CTAs generally demonstrate a lower chain transfer constant. Weaker CTAs may include 1,1-diphenylethylene, 9,10-dihydroanthracene, diethylbromomalonate, 2-naphthalenethiol, and b-bromostyrene. Stronger CTAs may include NDM and a-bromostyrene.

The CTAs may be used as additives in the presently disclosed process in any amount that results in a HIPS product having favorable swell index values. In an embodiment, CTAs are added to the process in any amounts ranging from 10 ppm to 10,000 ppm. In another embodiment, the CTAs are added to the process in amounts ranging from 100 to 1,000 ppm. In a further embodiment, the CTAs are added to the process in amounts ranging from 100 to 400 ppm.

The CTAs may be added at any location along the presently disclosed process. In an embodiment, the CTAs are added at any point after, or downstream of, the pre-inversion reactor. In another embodiment, the CTAs are added at any point after the first linear flow, or plug flow, reactor. In an alternative embodiment, the CTAs are added at any point after the first post-inversion reactor. In a further embodiment, the CTAs are added at any point between the first plug flow reactor and the last plug flow reactor. In an even further embodiment, the CTAs are added to HIPS product entering the devolatilizer.

In an embodiment, either by itself or in combination with any other embodiment of the invention, the HIPS of the present invention may also include additives as deemed necessary to impart desired physical properties, such as, increased gloss or color. Examples of additives include without limitation stabilizers, chain transfer agents, talc, antioxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure. For example, one or more additives may be added after recovery of the HIPS, for example during compounding such as pelletization. In an embodiment, additives may be present in the HIPS in an amount of from 0.01 wt. % to 50 wt. %, alternatively from 0.1 wt. % to 30 wt. %, alternatively from 0.5 wt. % to 20 wt. % based on the total weight of the HIPS.

In an embodiment, either by itself or in combination with any other aspect of the invention, ESCR (Environmental Stress Crack Resistance) enhancing additives may be added to the HIPS composition. The ESCR-enhancing additives may be added to the initial monomer/rubber feed stream or at any point in the polymerization process up to and including the final polymerization reactor. In an embodiment, the ESCR-enhancing additives include polyisobutylene (PIB), mineral oil, or combinations thereof. In another embodiment, the PIB, mineral oil, or combinations thereof are present in amounts of 0.5 to 3.0% by weight of the final product. In a further embodiment, both PIB and mineral oil are each present in amounts of 2.0% by weight of the final product.

An end use article may include a blend of the composition disclosed and produced by the process disclosed herein. In an embodiment, the articles include films, sheets and thermoformed or foamed articles. For example, a final article may be thermoformed from a sheet containing the blend. End use articles may be obtained from the polymeric compositions of this disclosure. In an embodiment, an article can be obtained by subjecting the polymeric composition to a plastics shaping process such as blow molding, extrusion, injection blow molding, injection stretch blow molding, thermoforming, and the like. The polymeric composition may be formed into end use articles including food packaging, office supplies, plastic lumber, replacement lumber, patio decking, structural supports, laminate flooring compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Several HIPS batches were produced using various styrene butadiene copolymers and tested. The linear polybutadiene (having a number average molecular weight (Mn) of 105,000 g/mol) used was Taktene 380 (now Buna CB 380) commercially available from Lanxess AG. The HIPS was obtained by polymerization of styrene monomer in the presence of 6 wt. % rubber based on the weight of the total mixture. The HIPS production was carried out at 70° C., 250 rpm, with 0.1 wt. % AIBN as the initiator. The initiator was AIBN produced by Sigma-Aldrich Corp. and was purified by means of recrystallization with ethanol. The copolymers were synthesized by means of anionic polymerization employing the high vacuum technique following the method described in *D. Uhrig, J. W. Mays, J. Polym. Sci. Part A: Poly Chem,* 43 (2005), 6179. With the exception of the HIPS batches in Example 1, all HIPS batches contained 7 wt. % of the copolymer in the rubber phase.

Table 2 lists the copolymer types and molecular weights of the copolymer used in the following examples.

TABLE 2

| Copolymer Designation | Copolymer Type/ Number of PS grafts | Graft Polystyrene Molecular Weight (kg/mol) | Total Polybutadiene Molecular Weight (kg/mol) |
|---|---|---|---|
| COP $S_1B_2$ - 1 | One Graft | 68 | 66 |
| COP $S_1B_2$ - 2 | One Graft | 69 | 102 |
| COP $S_1B_2$ - 3 | One Graft | 115 | 72 |
| COP $S_2B_2$ - 5 | Two Grafts | 106 | 236 |
| COP $S_2B_2$ - 6 | Two Grafts | 69 | 138 |
| COP $S_2B_2$ - 7 | Two Grafts | 76 | 104 |
| COP $S_2B_2$ - 8 | Two Grafts | 101 | 78 |
| COP $S_1B_1$ - 9 | Block | 75 | 57 |
| COP $S_1B_1$ - 10 | Block | 4.8 | 5.2 |

Example 1

Graft copolymer COP $S_1B_2$-1 was added in varying amounts to produce four HIPS blends. The HIPS comprised 94% by weight styrene monomer and 6% by weight of polybutadiene. The polybutadiene phase comprised 7, 15, 30, or 40% by weight of the COP $S_1B_2$-1. FIG. 2a-d shows the distribution of rubber particle size (μm) at different time intervals, for the HIPS containing 7, 15, 30, or 40% by weight of graft copolymer in the rubber phase, respectively. A narrow RPS distribution indicates that phase inversion has occurred. As FIGS. 2a-b indicate, phase inversion occurs later in time for higher amounts of graft copolymer.

Example 2

Graft copolymers COP $S_1B_2$-1 and COP $S_1B_2$-2 were used to test the effects of altering the molecular weight of polybutadiene in a single graft copolymer. In both copolymers the polystyrene arm was about 66 kg/mol. The total molecular weight of polybutadiene was 66 kg/mol for COP-$S_1B_2$-1 and 102 kg/mol for COP-$S_1B_2$-2.

Figure 3A:
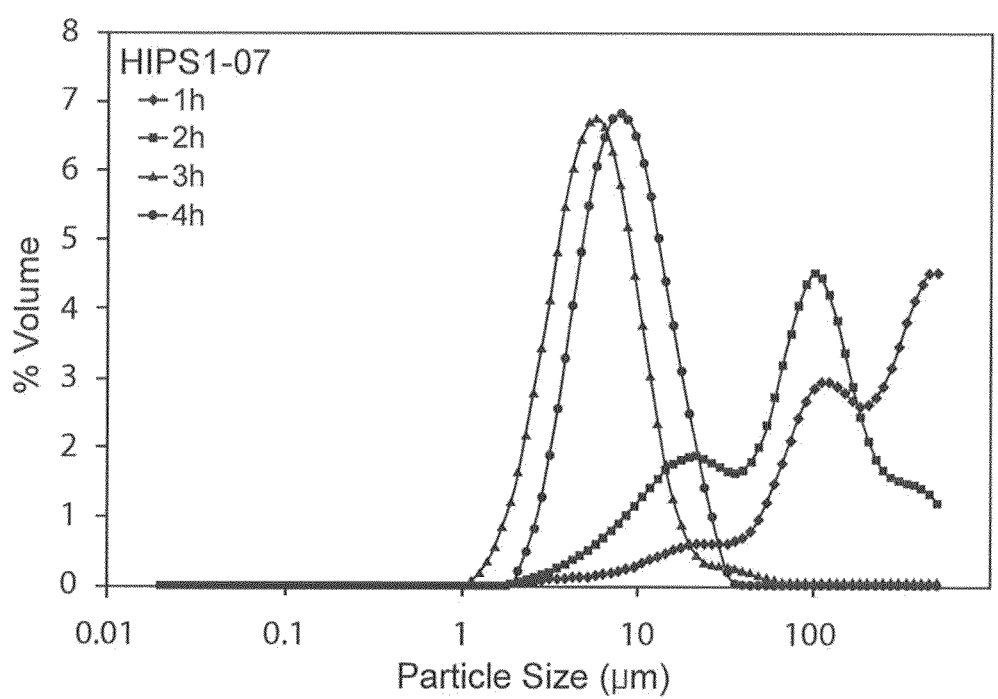
FIGS. 3a-b show the distribution of rubber particle size (μm) at different time intervals for COP-$S_1B_2$-1 and COP-$S_1B_2$-2, respectively.
Figure 3B:
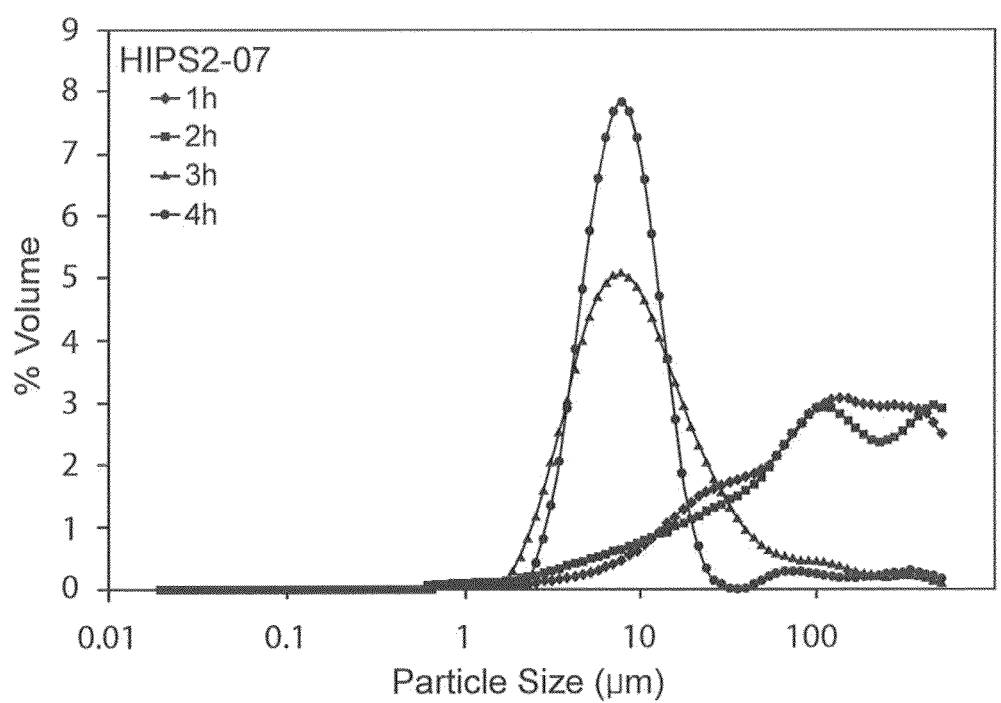

FIGS. 3a-b show the distribution of rubber particle size (μm) at different time intervals for COP-$S_1B_2$-1 and COP-$S_1B_2$-2, respectively. The figures suggest that phase inversion occurred later in the HIPS containing COP-$S_1B_2$-2, most likely due to higher molecular weight polybutadiene chains in the copolymer.

FIGS. 4a-b show TEM micrographs for the HIPS containing COP-$S_1B_2$-1 and COP-$S_1B_2$-2, respectively. $D_p$ for HIPS containing COP-$S_1B_2$-1 was 1.87 μm, while it was 1.96 μm for the HIPS containing COP-$S_1B_2$-2. The copolymer with the higher molecular weight polybutadiene chains yielded larger rubber particles.

Example 3

Graft copolymers COP $S_2B_2$-5 and COP $S_2B_2$-8 were used to test the effects of altering the molecular weight of polybutadiene in a two-graft copolymer. In both copolymers the graft polystyrene molecular weight was about 106 kg/mol. The total molecular weight of polybutadiene was 236 Kg/mol for COP-$S_2B_2$-5 and 78 kg/mol for COP-$S2B_2$-8

Figure 5A:
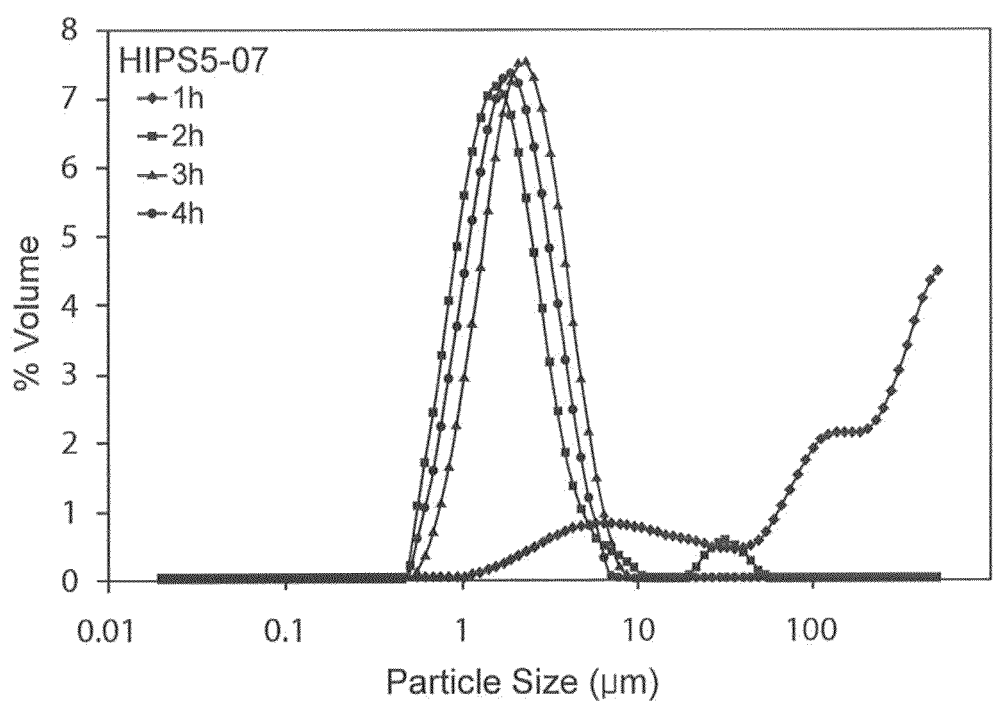
FIGS. 5a-b show the distribution of rubber particle size (μm) at different time intervals for COP-$5_2B_2$-5 and COP-$S_2B_2$-8, respectively.
Figure 5B:
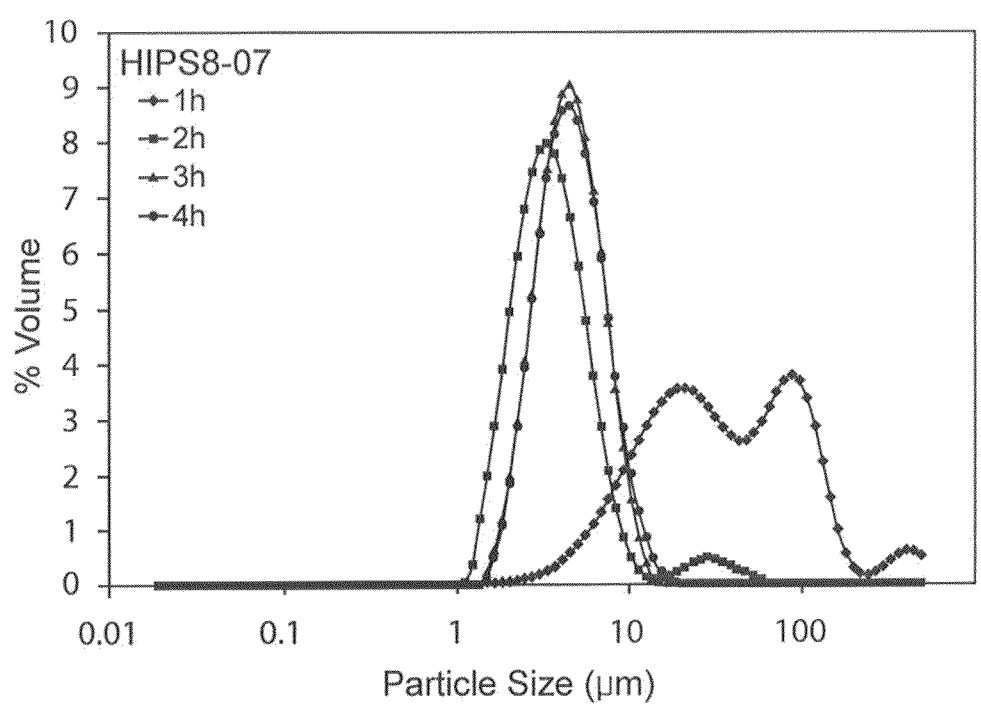
Figure 6A:
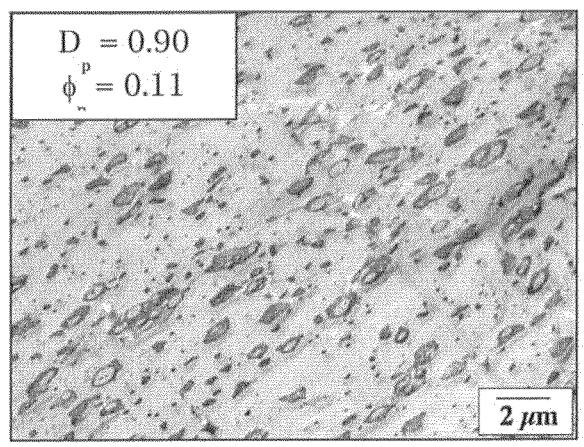
FIGS. 6a-b show TEM micrographs for the HIPS containing COP-$S_2B_2$-5 and COP-$S_2B_2$-8, respectively.
Figure 6B:
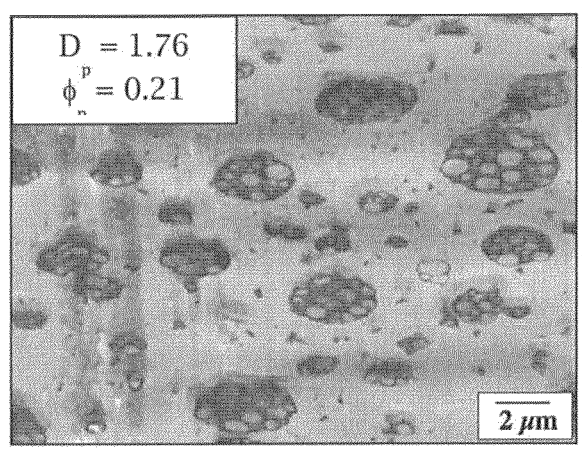

FIGS. 5a-b show the distribution of rubber particle size (μm) at different time intervals for COP-$S_2B_2$-5 and COP-$S_2B_2$-8, respectively. FIGS. 6a-b show TEM micrographs for the HIPS containing COP-$S_2B_2$-5 and COP-$S_2B_2$-8, respectively. $D_p$ for HIPS containing COP-$S_2B_2$-5 was 0.90 μm, while it was 1.76 μm for the HIPS containing COP-$S_2B_2$-8.

Example 4

Graft copolymers COP $S_1B_2$-1 and COP $S_1B_2$-3 were used to test the effects of altering the molecular weight of polystyrene in a single graft copolymer. The molecular weight of the polystyrene chain was about 68 kg/mol for COP-$S_1B_2$-1 and 115 kg/mol for COP-$S_1B_2$-3. In both copolymers the total polybutadiene molecular weight was around 70 kg/mol.

Figure 7A:
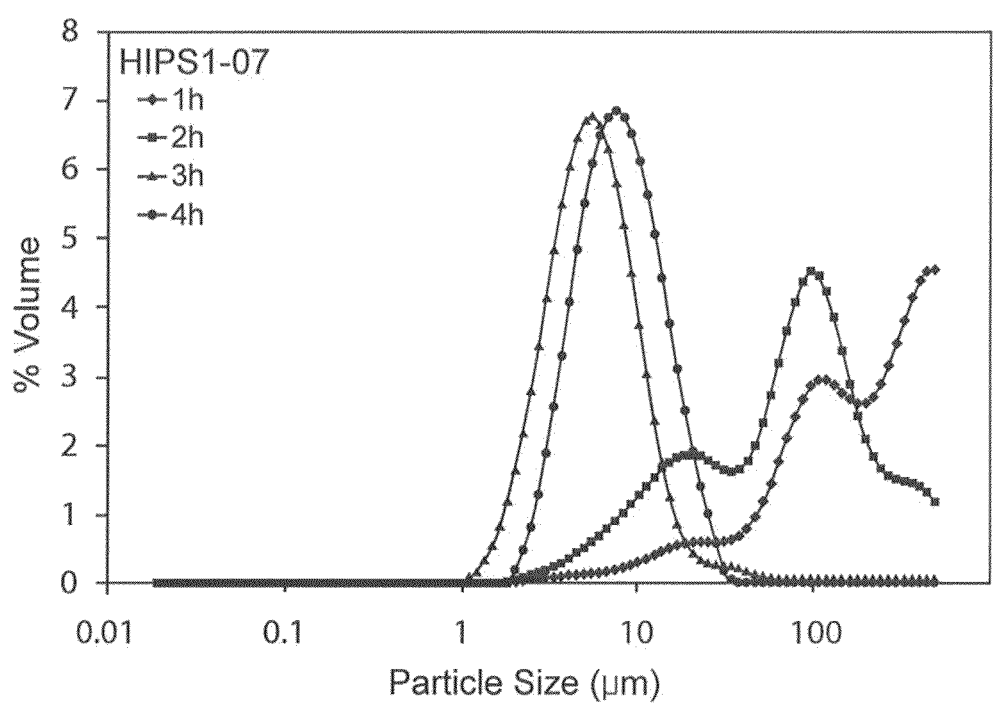
FIGS. 7a-b show the distribution of rubber particle size (μm) at different time intervals for COP-$5_1B_2$-1 and COP-$S_1B_2$-3, respectively.
Figure 7B:
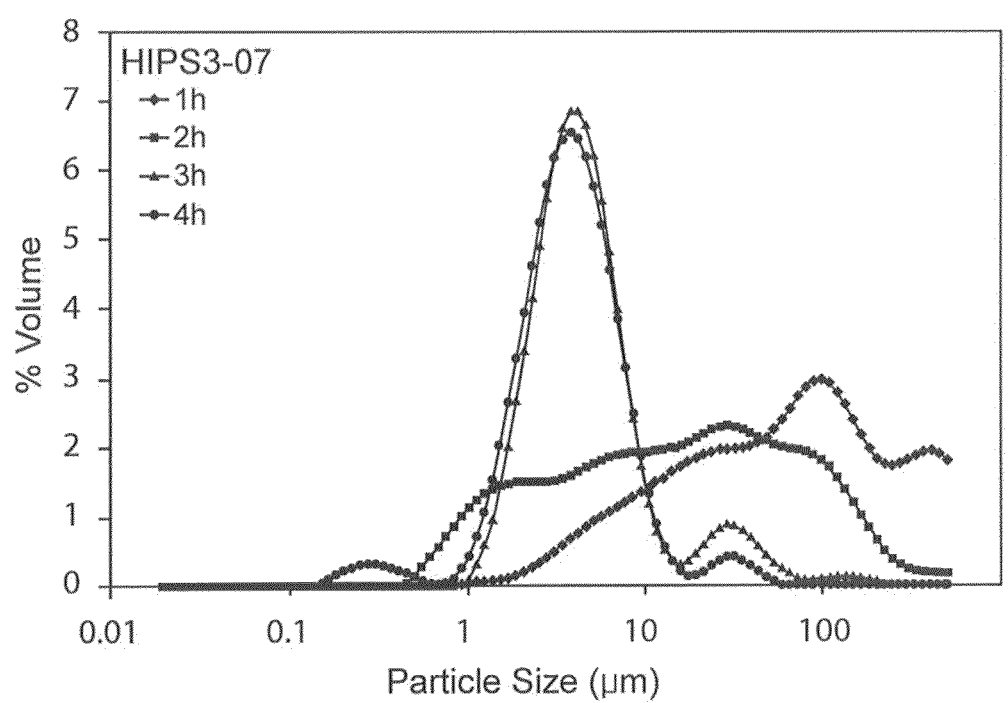
Figure 8A:
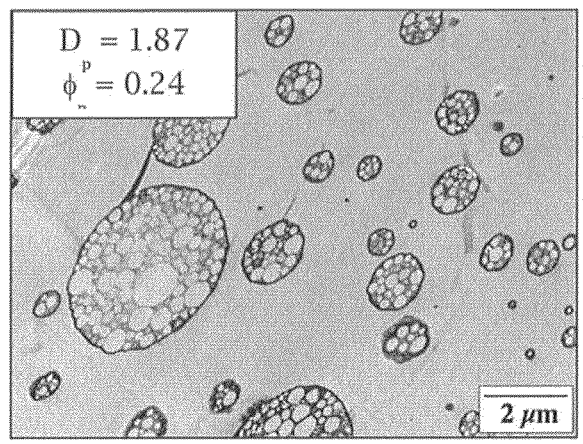
FIGS. 8a-b show TEM micrographs for the HIPS containing COP-$S_1B_2$-1 and COP-$S_1B_2$-3, respectively.
Figure 8B:
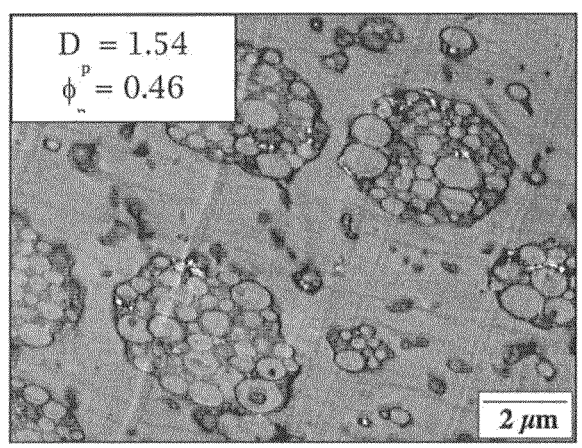

FIGS. 7a-b show the distribution of rubber particle size (μm) at different time intervals for COP-$S_1B_2$-1 and COP-$S_1B_2$-3, respectively. The figures suggest that phase inversion occurred earlier in the HIPS containing COP-$S_1B_2$-3, most likely due to higher molecular weight polystyrene chains in the copolymer. FIGS. 8a-b show TEM micrographs for the HIPS containing COP-$S_1B_2$-1 and COP-$S_1B_2$-3, respectively. $D_p$ for HIPS containing COP-$S_1B_2$-1 was 1.87 μm, while it was 1.54 μm for the HIPS containing COP-$S_1B_2$-3. The copolymer with the higher molecular weight polystyrene chains yielded smaller rubber particles.

Example 5

Figure 9A:
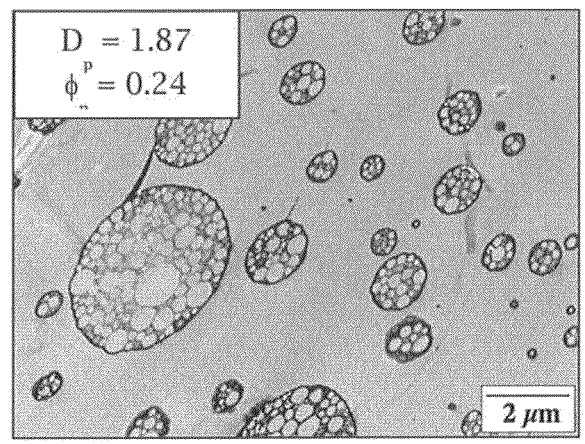
FIGS. 9a-b show TEM micrographs for the HIPS containing COP-$S_1B_2$-1 and COP-$S_2B_2$-6, respectively.
Figure 9B:
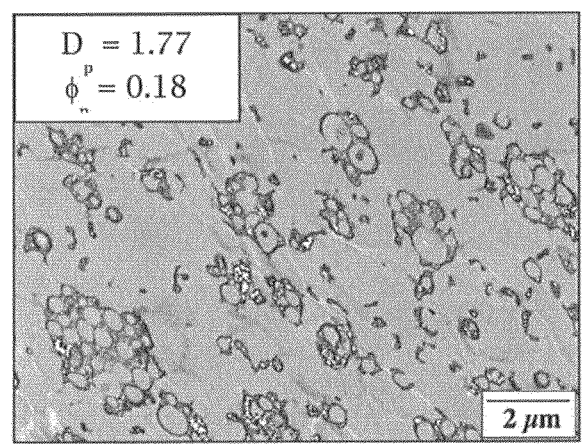

Graft copolymers COP-$S_1B_2$-1 and COP-$S_2B_2$-6 were used to test the effects of using a single graft copolymer versus a two graft copolymer. FIGS. 9a-b show TEM micrographs for the HIPS containing COP-$S_1B_2$-1 and COP-$S_2B_2$-6, respectively. $D_p$ for HIPS containing COP-$S_1B_2$-1 was 1.87 μm, while it was 1.77 μm for the HIPS containing COP-$S_2B_2$-6. The copolymer with two polystyrene grafts yielded smaller rubber particles.

Example 6

Figure 10A:
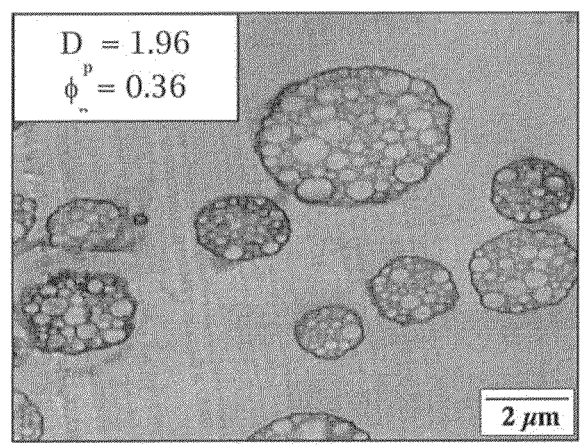
FIGS. 10a-b show TEM micrographs for the HIPS containing COP-$S_1B_2$-2 and COP-$S_2B_2$-7, respectively.
Figure 10B:
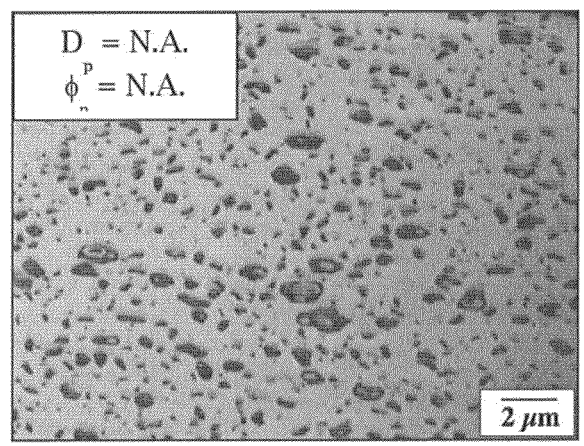

Graft copolymers COP-$S_1B_2$-2 and COP-$S_2B_2$-7 were used to test the effects of using a single graft copolymer versus a two graft copolymer. FIGS. 10a-b show TEM micrographs for the HIPS containing COP-$S_1B_2$-1 and COP-$S_2B_2$-7, respectively. $D_p$ for HIPS containing COP-$S_1B_2$-1 was 1.96 μm. HIPS containing COP-$S_2B_2$-7 had dot morphology, and the rubber particle size could not be characterized.

Example 7

Block copolymers COP $S_1B_1$-9 and COP $S_1B_1$-10 were used to test the effects of altering the molecular weight of the entire copolymer. The total molecular weight for COP $S_1B_1$-9 was about 132 kg/mol, while it was about 10 kg/mol for COP $S_1B_1$-10.

Figure 11A:
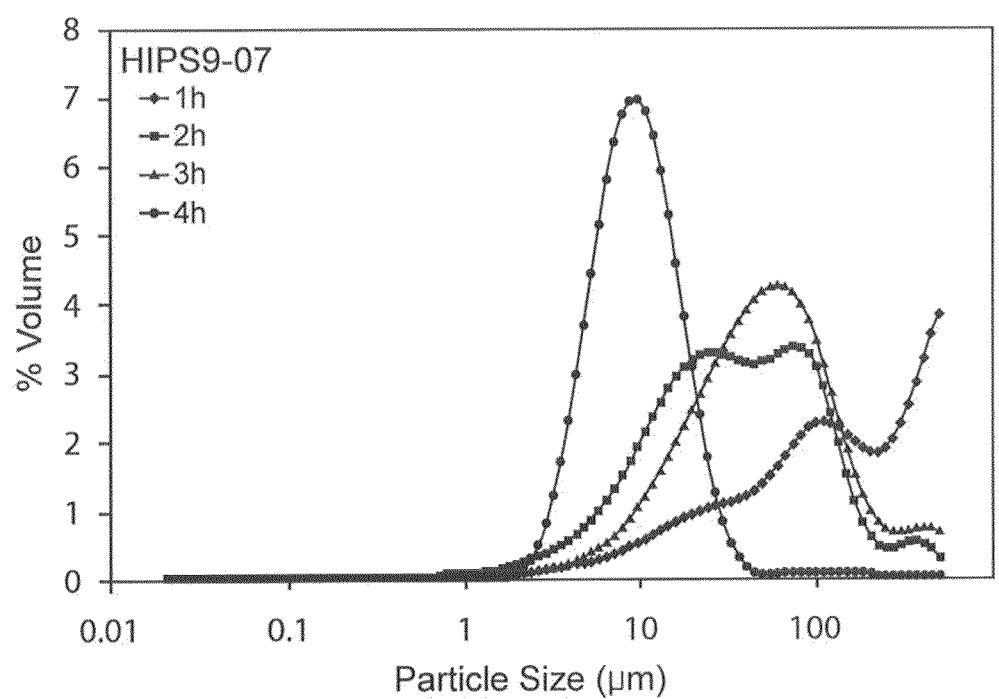
FIGS. 11a-b show the distribution of rubber particle size (μm) at different time intervals for COP $5_1B_1$-9 and COP $S_1B_1$-10, respectively.
Figure 11B:
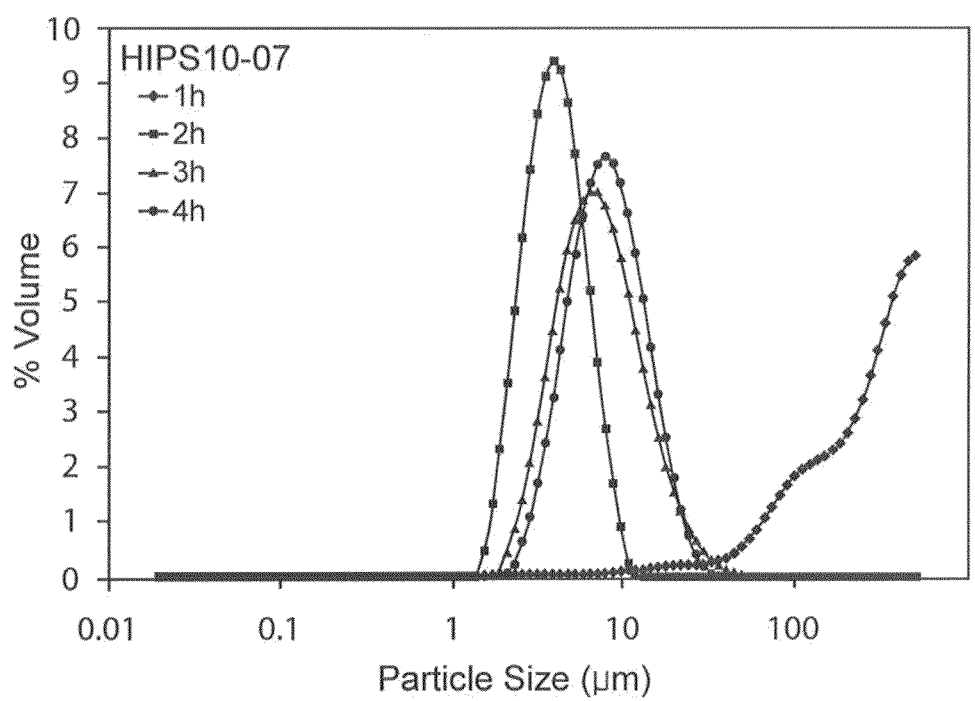
Figure 12A:
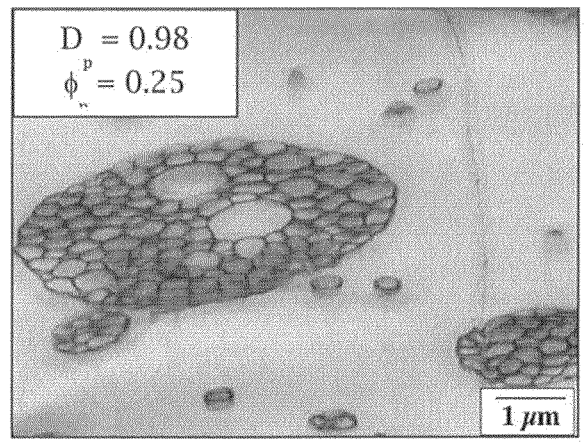
FIGS. 12a-b show TEM micrographs for the HIPS containing COP $S_1B_1$-9 and COP $S_1B_1$-10, respectively.
Figure 12B:
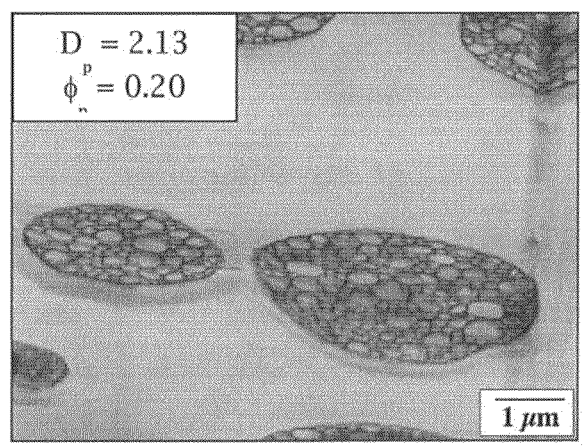

FIGS. 11a-b show the distribution of rubber particle size (μm) at different time intervals for COP $S_1B_1$-9 and COP $S_1B_1$-10, respectively. Phase inversion occurred earlier in the copolymer of lower molecular weight, COP $S_1B_1$-10, probably due to a lower viscosity. FIGS. 12a-b show TEM micrographs for the HIPS containing COP $S_1B_1$-9 and COP $S_1B_1$-10, respectively. $D_p$ for HIPS containing COP $S_1B_1$-9 was 0.98 μm, while it was 2.13 μm for the HIPS containing COP $S_1B_1$-10.

Example 8

In this example, four samples of HIPS were produced using copolymers COP $S_1B_2$-2 and COP $S_2B_2$-8. The copolymers were added at different times during polymerization, and each sample was investigated under an electron microscope to observe the amount of polystyrene occlusions in each sample.

The morphology of the HIPS products was analyzed by an electron microscope. In the HIPS materials prepared using COP $S_1B_2$-2, the appearances of large sized blockages, or polystyrene occlusions, inside the rubber particles are visible as seen in FIG. 13a and when the COP $S_1B_2$-2 is added after 30 minutes from the start of the reaction, the number of polystyrene occlusions inside the rubber particles are increased as seen in FIG. 13c. In the HIPS materials prepared using COP $S_2B_2$-8, the presence of polystyrene occlusions is more noticeable as seen in FIGS. 13b and 13d. This role is attributed to the behavior of COP $S_2B_2$-8, because upon being added at the beginning of the reaction the system presents a separation of phases, where the graft polymer is located in the inter-phase, which would promote emulsion stability, and therefore, induce the formation of small polystyrene occlusions.

As used herein, the term "chain" refers various lengths of repetitive units of atoms (monomer residues) which make up the polymer, and which affect the properties of the polymer.

As used herein, the term "chain transfer" refers to the abstraction of an atom from another molecule (initiator, monomer, polymer, or solvent) by the radical end of a growing (addition) polymer, which simultaneously terminates the polymer chain and creates a new radical capable of chain polymerization; chain transfer also occurs in cationic polymerization.

As used herein, the term "chain transfer agent" refers to an agent used in polymerization, which has the ability to stop the growth of a molecular chain by yielding an atom to the active radical at the end of the growing chain. It in turn is left as a radical that can initiate the growth of a new chain. Chain transfer agents can be useful for lowering molecular weights in polymerization reactions.

As used herein, the term "Continuous Stirred-Tank Reactor," and "Continuously-Stirred Tank Reactor" and "CSTR," refers to a tank which has a rotor which stirs reagents within the tank to ensure proper mixing; a CSTR can be used for a variety of reactions and processes.

As used herein, the term "copolymer" refers to a mixed polymer, and is the product of polymerization of two or more substances.

As used herein, the term "cross-link" refers to covalent bonds that link adjacent polymer chains together.

As used herein, the term "cross-linking agent" refers to a substance that promotes or regulates intermolecular covalent bonding between polymer chains, linking them together to create a more rigid structure.

As used herein, the term "elastomer" refers to an amorphous, cross-linked polymer which will stretch rapidly under tension; a macromolecular material that at room temperature returns rapidly to approximately its initial dimensions and shape after deformation by stress and release of the stress.

As used herein, the term "graft copolymer" refers to a copolymer in which polymeric side chains have been attached to the main chain of a polymer of a different structure.

As used herein, the term "homopolymer" refers to a polymer resulting from polymerization involving a single monomer.

As used herein, the term "initiator" refers to a substance or molecule, other than reactant, that initiates a chain reaction, such as in polymerization.

As used herein, the term "inversion reactor" refers to a polymerization reactor in which phase inversion occurs.

As used herein, the term "MFI" and "melt flow index" refers to the number of grams of polymer that can be pushed out of a capillary die of standard dimensions, and is expressed in grams/10 minutes.

As used herein, the term "molecular weight distribution" or "MWD" refers to the frequency of occurrence of the different molecular weight chains in a homologous polymeric system.

As used herein, the term "monomer" typically refers to a small molecule of low molecular weight that may become chemically bonded to other monomers to form a polymer.

As used herein, the term "phase inversion" refers to a discrete point at which polystyrene forms a continuous phase in a solution and styrene and rubber transition from a continuous phase to a discontinuous phase.

As used herein, the term "polymer" is a generic term used to describe a substance made of molecules that have one or more types of repeating monomeric units connected by chemical bonds. A polymer has chains of varying lengths which occur because polymer chains terminate during polymerization after random intervals of chain lengthening (propagation).

As used herein, the term "polymer backbone" refers to the main chain of the polymer and has one or more types of repeating subunits. One or more side chains can be attached to the polymer backbone and can have a multitude of structures.

As used herein, the term "polymerization" refers to a process of reacting monomer molecules together in a chemical reaction to form linear chains or a three-dimensional network of polymer chains.

As used herein, the term "polystyrene" refers to a synthetic polymer prepared by polymerization (e.g., a simple one ring aromatic group with a vinyl group attached).

As used herein, the term "pre-inversion" refers to the initial stages of polymerization of a styrene monomer-rubber mixture, wherein styrene and rubber are in a continuous phase in a solution while polystyrene is in a discontinuous phase.

While the invention has been described herein in terms of embodiments, these embodiments are not to be taken as limiting the scope of the invention. It is deemed to be within the scope of the present invention that each embodiment disclosed herein is usable with each and every other embodiment disclosed herein and that all embodiments disclosed herein are combinable with each other.

While illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

The terms "Continuous Stirred-Tank Reactor," "Continuously-Stirred Tank Reactor," and "CSTR," refer to a tank type reactor having a means for stirring reagents within the tank to ensure proper mixing; a CSTR can be used for a variety of reactions and processes.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A method for producing high impact polystyrene having a multimodal rubber particle size distribution, comprising:
   feeding at least one vinyl aromatic monomer and at least one elastomer to at least one polymerization reactor to form a reaction mixture;
   polymerizing the reaction mixture to a point below the point at which phase inversion occurs;
   adding at least one copolymer to the polymerized reaction mixture leaving the at least one polymerization reactor to form a combined mixture;
   subjecting the combined mixture to further polymerization; and
   obtaining a HIPS product from the further polymerization having a multimodal rubber particle size distribution.

2. The method of claim 1, wherein:
   the copolymer comprises a graft copolymer comprising polystyrene grafted on an elastomer backbone or a block copolymer comprising a styrene-butadiene block copolymer, a styrene-butadiene-styrene triblock copolymer, or combinations thereof.

3. The method of claim 1, wherein the at least one polymerization reactor comprises a pre-inversion reactor.

4. The method of claim 1, wherein the at least one polymerization reactor comprises a pre-inversion reactor followed by an inversion reactor.

5. The method of claim 1, wherein the at least one polymerization reactor comprises a pre-inversion reactor followed by an inversion reactor followed by at least one post-inversion reactor.

6. The method of claim 1, wherein the reaction mixture further comprises a free radical initiator.

7. The method of claim 2, wherein the graft copolymer comprises two polystyrene grafts on the elastomer backbone.

8. The method of claim 2, wherein the elastomer backbone is a polybutadiene backbone.

9. The method of claim 8, wherein the copolymer is produced using an organolithium initiator for the anionic polymerization of polystyrene and polybutadiene chains to predetermined molecular weights, and the polystyrene and polybutadiene chains are joined by a polyfunctional coupling agent.

10. The method of claim 8, wherein the molecular weight of the at least one polystyrene chain is from 50 to 200 kg/mol per chain.

11. The method of claim 8, wherein the molecular weight of the polybutadiene backbone is from 50 to 250 kg/mol per chain.

12. The method of claim 4, wherein the copolymer is added before the inversion reactor.

13. The method of claim 4, wherein the copolymer is added to the inversion reactor.

14. The method of claim 1, wherein the copolymer is added in amounts ranging from 0.5 to 40 wt. % based on the total weight of the elastomer.

15. The method of claim 1, wherein the HIPS product comprises rubber particles having polystyrene occlusions.

16. A high impact polystyrene made from the method of claim 1.

17. An article made from high impact polystyrene made by the method of claim 1.

18. The method of claim 8, wherein the copolymer is produced using an organolithium initiator for the anionic polymerization of polystyrene and polybutadiene chains to predetermined molecular weights, and the polystyrene and polybutadiene chains are joined by a coupling agent comprising chlorosilane.

19. The method of claim 8, wherein the copolymer is produced using an organolithium initiator for the anionic polymerization of polystyrene and polybutadiene chains to predetermined molecular weights, and the polystyrene and polybutadiene chains are joined by a coupling agent comprising 1,1-diphenylethylene.

* * * * *